Sept. 4, 1962

W. L. McCANN 3,052,262

POWER ACTUATED MULTIPLE VALVE

Filed Feb. 1, 1960

INVENTOR.
Walter L. McCann
BY Wolfe, Hubbard,
Voit & Osann
Attys.

Sept. 4, 1962 W. L. McCANN 3,052,262
POWER ACTUATED MULTIPLE VALVE
Filed Feb. 1, 1960 4 Sheets-Sheet 2
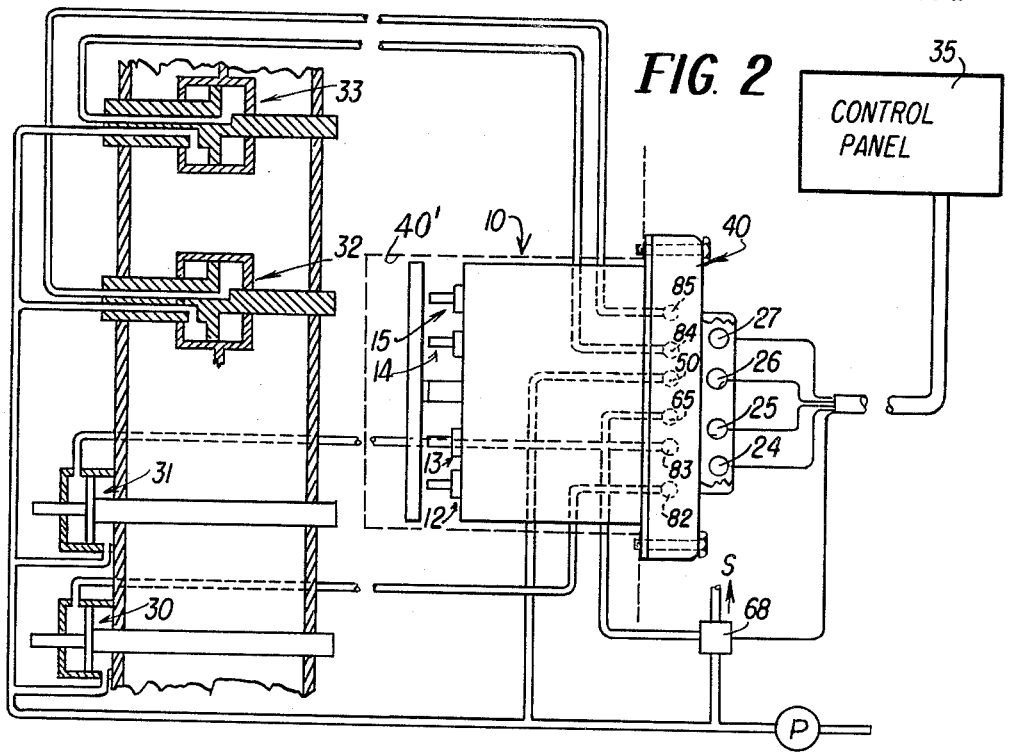
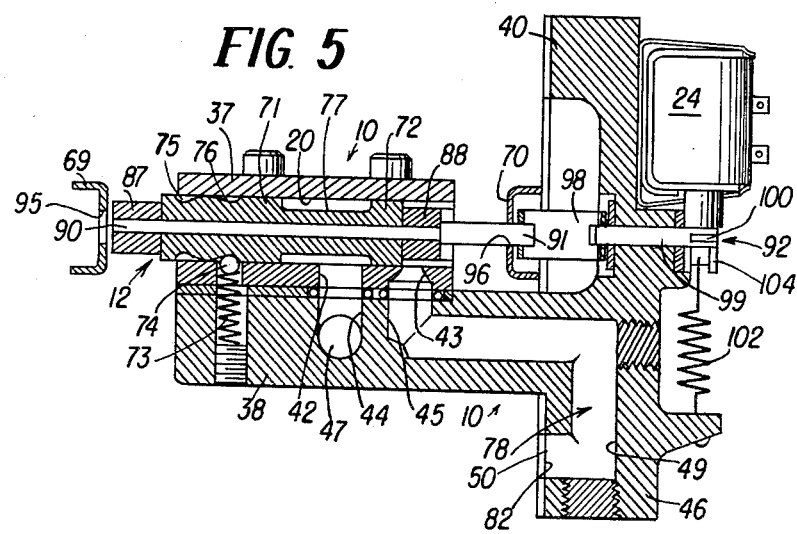
INVENTOR.
Walter L. McCann
BY Wolfe, Hubbard,
Voit & Osann
Attys.

Sept. 4, 1962      W. L. McCANN      3,052,262

POWER ACTUATED MULTIPLE VALVE

Filed Feb. 1, 1960      4 Sheets-Sheet 3

INVENTOR.
Walter L. McCann.
BY Wolfe, Hubbard,
Voit & Osann
Attys.

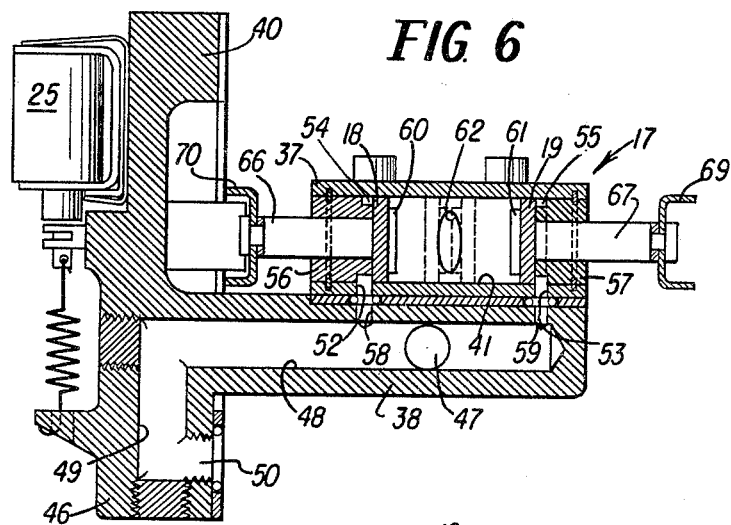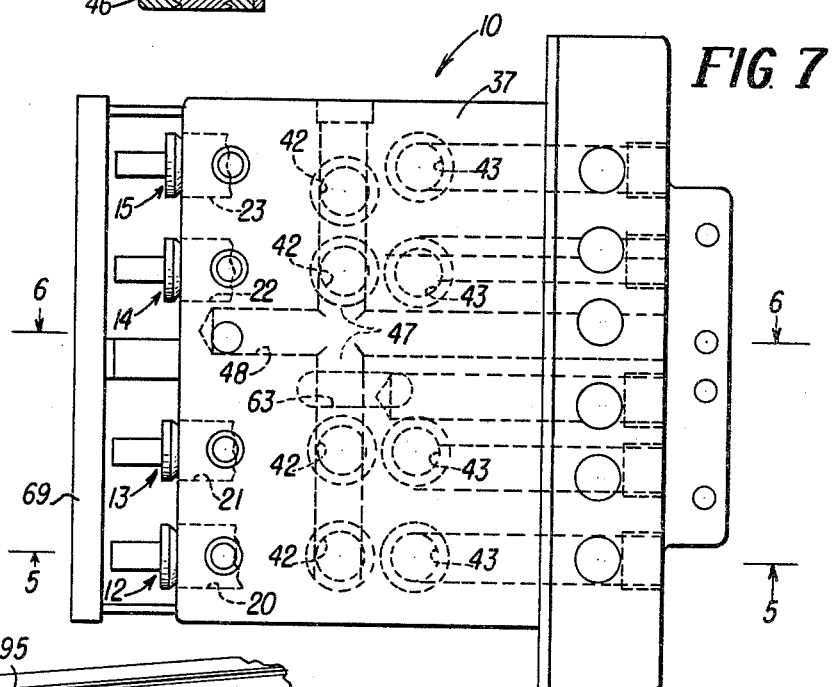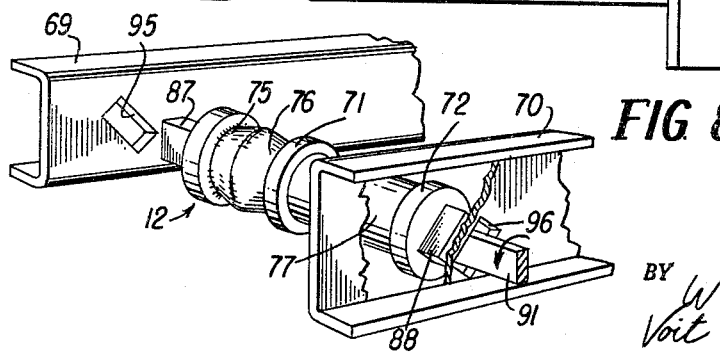

3,052,262
Patented Sept. 4, 1962

3,052,262
POWER ACTUATED MULTIPLE VALVE
Walter L. McCann, Fond du Lac, Wis., assignor to Giddings & Lewis Machine Tool Company, Fond du Lac, Wis., a corporation of Wisconsin
Filed Feb. 1, 1960, Ser. No. 5,707
15 Claims. (Cl. 137—622)

This invention relates to multiple valves and more particularly remote controlled multiple valves.

Multiple valves of the type to which this invention is directed conventionally include a plurality of control sections each with the valve member serving a controlled unit. Multiple valves of this type have many uses, but for illustration the invention has been disclosed in a multiple valve used for controlling delivery of fluid under pressure to a plurality of gear shifting or clutch shifting cylinders for obtaining different speeds in the transmission of a machine tool.

One of the primary objects of the invention is to provide a hydraulically actuated multiple valve having electrical means for selecting the valve members to be actuated. A related object is to provide a multiple valve, the valve members of which are set directly in a mechanical operation to a predetermined pattern which may be established by electrical means.

Another object is to provide a multiple valve the valve members of which are simultaneously shifted by direct engagement by members of a hydraulic power unit without interposed motion translating linkages.

A further object is to provide a novel arrangement for coupling a power unit to operate the individual valve members of a multiple valve, wherein a pair of power members movable in mutually opposite directions shift selected valve members.

Other objects and advantages of the invention will become apparent from the following detailed description taken in connection with the accompanying drawings, in which:

FIG. 2 is a schematic view of an electrically controlled hydraulic circuit for machine tool components which includes the multiple valve of FIGURE 1;

FIG. 5 is a vertical sectional view showing a valve taken substantially in the plane of lines 5—5 of FIG. 7;

FIG. 6 is a vertical sectional view showing the power cylinder taken substantially in the plane of lines 6—6 of FIG. 7;

FIG. 7 is a horizontal elevational view looking at the bottom of the multiple valve illustrated in FIGURE 1; and FIG. 8 is a fragmentary perspective view of the opposed power bars and one of the shiftable valve members.

Figure 1:
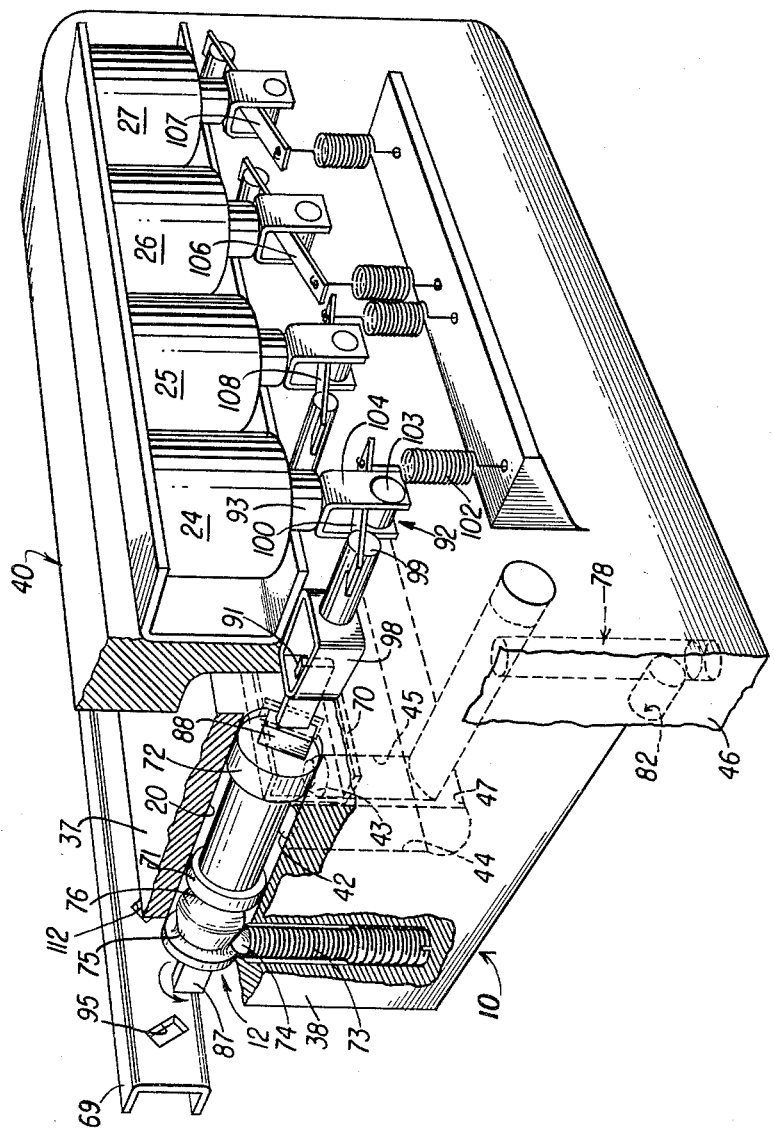
FIGURE 1 is a perspective view with parts broken away of a multiple valve embodying the novel features of the present invention.

While the invention is susceptible of various modifications and alternative constructions, an illustrative embodiment has been shown in the drawings and will be described below in considerable detail. It should be understood, however, that there is no intention to limit the invention to the specific form disclosed, but on the contrary, the intention is to cover all modifications, alternative constructions and equivalents falling within the spirit and scope of the invention as expressed in the appended claims.

In the drawings the invention is shown for purposes of illustration incorporated in a multiple valve 10 comprising a row of shiftable spool type piston valves 12–15 arranged in pairs on opposite sides of a hydraulic power cylinder assembly 17, shown in section in FIG. 6, for actuating the piston valve members. While there happens to be four valves in the multiple valve which is illustrated, a greater or fewer number of valves may be included as desired. The hydraulic power cylinder assembly 17 includes a pair of reciprocable power pistons 18, 19 operable to shift the piston valve members 12–15. Each piston valve member is slidably received in a bore 20–23, as shown in FIGURE 1, and in the present case forms a three way, two position valve having an open position, as shown in FIGURE 1, and a closed position as shown in FIG. 5.

According to one of the main features of the invention the power pistons 18, 19 directly actuate selected piston valve members upon movement of the power pistons to simultaneously shift all the valve members to the open or closed positions. For selecting the valve members for actuation, remotely controlled electrical devices, herein shown as solenoids 24–27, are provided in association with the individual valves 12–15.

The multiple valve thus comprises a plurality of control sections each of which, as shown in FIG. 2, is adapted to be connected to a hydraulic device, herein shown as a differential cylinder assembly 30–33. By the remotely controlled solenoids 24–27, combinations of valve members 12–15 may be selected to control the supply of pressure fluid to the differential cylinder assemblies 30–33 in any desired manner. As examples, the cylinder assemblies to which the multiple valve is connected may be used for actuating clutches or for shifting gears in a machine tool spindle or table transmission, although the possible uses for the multiple valve are not restricted and the invention has other applications as will appear hereinafter. It will be readily appreciated that with this arrangement the valve members 12–15 of the multiple valve may be actuated in any desired combination. Such an arrangement has particular utility in connection with a machine tool spindle transmission, to provide a control for setting clutches and gears so as to obtain graduated speeds over an entire speed range. With the arrangement pictured the spindle speed may be set manually by adjusting a dial (not shown) on the control panel 35, the electrical solenoids 24–27 being energized according to a predetermined combination to provide the required combination of valves. To this end the multiple valve includes the four solenoids 24–27, one for each valve member 12–15, and a mechanism operated by each solenoid for setting each valve member for actuation. With this arrangement the pressure fluid supplied to the multiple valve 10 for control purposes may be used to operate the power cylinder assembly 17 to actuate the valve members 12–15 while a relatively simple electrical mechanism, with low power requirements, may be used to control the pattern of actuation or combination of valve members.

Turning now in greater detail to the features of the multiple valve 10, for convenience in manufacture and assembly, as shown in FIGS. 4–7, the individual valves 12–15 and the power cylinder assembly 17 for actuating the valves are carried in a rectangular valve block 37 which is fixed flat on a horizontal central section 38 of a T-shaped member 40 which serves both as a means for supporting the mechanism for selecting the valves for actuation and also as a manifold for coupling pressure fluid supply and outlet lines to the valves. The T-shaped member is adapted for mounting, as shown in FIG. 2, for example, on a machine tool frame, with the valve block 37 extending into a sealed recess or pocket 40' which is connected to the sump S or reservoir. This valve block 37 is provided with the parallel bores 20–23 for the piston valve members as well as with a larger diameter bore 41 for the power pistons 18, 19. Passages (FIGURES 1, 5) intersecting the valve bores 20–23 provide inlet and outlet ports 42, 43. The inlet and outlet port passages in the valve block 37 extend vertically downward and register with passages 44, 45 respectively, in the frame 40 which lead eventually to the lower end 46 of the frame 40 where the inlet and outlet lines of FIG. 2 may be connected by suitable couplings (not shown). Referring to FIGS. 5, 6 and 7, it will be seen that a pressure port 42 is provided in each valve bore 20–23 adjacent the center of the latter while an outlet port 43 is provided adjacent the right-hand end of the bore as viewed in FIG. 5. The pressure ports 42 of all four valve bores 20–23 are interconnected by the vertical passages in the valve block and a lateral pressure fluid supply passage 47 in the horizontal central section of the frame which extends transversely to the bores spaced below the latter as appears in FIGS. 5 and 7. A longitudinal pressure fluid supply passage 48 in the horizontal central section 38 of the frame arranged perpendicular to the lateral passage interconnecting the valve bores and intersecting therewith leads to the left end of the frame as viewed in FIG. 6 and is connected to a vertical passage 49 extending to the lower end 46 of the frame 40 where coupling may be made to a supply line in the hydraulic system (FIG. 2). When pressure fluid is introduced into this series of interconnected pressure fluid supply passages through an inlet port 50 at the lower end 46 of the frame 40, some of the fluid will flow through the interconnected lateral and longitudinal passages 47, 48 in the central section 38 of the frame to the pressure port 42 at the center of each valve. The fluid is also conducted to the power pistons 18, 19 to apply pressure to move the latter mutually toward each other in a power stroke. To this end, as shown in FIG. 6, a pair of vertical passages 52, 53 are provided in the valve block 37 extending to grooves 54, 55 in the end walls of the power cylinder which end walls are formed by plugs 56, 57 fixed in the bore 41. The vertical passages 52, 53 in the valve block 37 register with vertical passages 58, 59 in the central section 38 of the frame 40 which connect to the longitudinal pressure fluid supply passage 48 provided therein. The power pistons 18, 19 move in the power stroke into mutual contact separated only by a spacing projection 60, 61, as shown in dotted lines in FIG. 6.

For returning the power pistons 18, 19 to the outward position in which they are pictured in FIG. 5, for example, means are provided for introducing pressure fluid between the power pistons. In this case a return port 62 (FIG. 6) is formed in one side of the power cylinder wall by a short vertical passage 62 (FIG. 7) which intersects the cylinder bore 41. A series of interconnected horizontal and vertical passages form passage means 64 in the frame leading to a port 65 (FIG. 3) at the lower end of the frame 46 where a line may be connected. Because of the differential in effective area on the opposite side of each power piston (due to the piston rods 66, 67 which reduce the effective area on the remote sides of the pistons) the power pistons 18, 19 may be moved outward by connecting the space between the pistons to the pressure fluid supply while the remote sides of the pistons remain connected to the pressure fluid supply. With this arrangement, provision is required to connect the space between the power pistons to drain in order to release the pistons 18, 19 for the power stroke. For illustrative purposes a three-way valve 68 electrically connected to the control panel 35 is shown for connecting the lines and passage means 64 leading to the pistons return port 62 alternatively to the sump or to the pressure fluid supply. The third position of the valve 68 is a closed position to block flow from the power cylinder through the return port 62 and thus hold the pistons 18, 19 at the outward position.

As hereinbefore described, the present invention provides means by which selected combinations of the piston valves 12–15 are shifted directly by the power pistons 18, 19 during the power stroke of the latter. For this purpose selector means are carried by each valve member which occupy two positions and which may be set by energizing one of the solenoids 24–27 electrically from the remotely located control panel 37. In one position of this selector means the valve member is shifted to the closed position by a bar moved by the power pistons, or, if in that position remains there during the power stroke, while in the other position of the selector means the valve member is shifted to the open position by another bar moved by the power pistons, or if in that position remains there during the power stroke. In the present case, spaced power bars 69, 70 are used which are movable mutually toward each other in the power stroke, and each valve actuating member is provided with a pair of elements, herein shown as shifter blocks associated with the power bars 69, 70 respectively, and which may be set by the electrical means to mutually complementary positions so that upon operation of the power pistons 18, 19 the valve members 12–15 are shifted in one direction or the other depending on the setting of the selector elements.

In carrying out this aspect of the invention each of the pair of opposed pistons 18, 19 carries a horizontal channel member forming the power bar 69, 70 by means of the piston rods 66, 67. Each of the power bars 69, 70 is horizontal and in alignment with the valve members 12–15 at one end and is movable toward the latter from the outward position in which it is pictured in FIG. 8, for example. Preferably the control means is so arranged that the bars come together automatically just long enough to cause the shift, and then separate. In the present case, referring to FIG. 5, each spool type piston valve member 12–15 includes a pair of spaced large diameter sections 71, 72 between which pressure fluid is introduced from the pressure port 42, providing a balanced valve. A detent means 73 includes a ball 74 which may be seated in either of two valve member grooves 75, 76 to yieldingly fix the valve member at the open or closed positions. A valve member 12 is shown in the closed position in FIG. 5, where communication is cut off between the pressure port 42 and the outlet port 43 and the latter communicates with the recess or pocket 40' so fluid may drain into the recess from the differential cylinder assemblies 30–33 through the lines leading therefrom and coupled to the valve. By moving the valve member 12 to the right, communication is established between the pressure port 42 and the outlet port 43 since the fluid may pass along the small section 77 of the spool between said ports to supply pressure fluid to the differential cylinder assemblies. The outlet port 43 for each valve 12–15 is connected by vertical and horizontal passages in the valve block 37 and frame 40 forming passage means 78–81 leading to individual outlet openings 82–85 at the lower end 46 of the frame, at which point coupling connection may be made by suitable couplings to a line in the hydraulic system (FIG. 2).

For moving the power bars 69, 70 each power piston 18, 19 is fixed thereto by the piston rods 66, 67 which is slidably received in the adjacent cylinder end wall, suitable provision being made for sealing against fluid leakage past the piston rods. In order to transmit the inward movement of the power bars 69, 70 to the valve members 12–15, to shift the latter in one direction or another; that is, from right to left in FIG. 5 or from left to right, each valve member 12–15 is provided at each end with a rotatably positionable element herein shown as rectangular shifter blocks 87, 88, like reference numerals being applied to the shifter blocks for all valves. The associated rectangular shifter blocks 87, 88 occupy alternative positions and are moved between these positions by the adjacent solenoids 24–27. In the present case the shifter blocks 87, 88 for each valve are rigidly connected by a shaft 90 extending through an axial opening through the center of the valve member to which the blocks are fixed. Referring to the arrangement with the left valve 12 shown in FIGURES 1, 5 and 8, it being understood that substantially the same arrangement is used for the other valves 13–15, the shifter blocks 87, 88 and shaft 90 form an assembly which may be rotated by the adjacent solenoid 24 by means of an extension 91 and mechanism 92 (FIGURE 1) for translating the straight line motion of the solenoid armature 93 to rotary motion of the blocks 87, 88. As shown in FIG. 8, in the present case the rectangular blocks 87, 88 at the opposite ends of the valve member 12 are in mutually complementary angularly offset positions with respect to rectangular openings 95, 96 aligned with the blocks and formed in the adjacent power bars 69, 70. Thus with the block at one end of the valve member vertical and out of alignment with the opening in the adjacent power bar, the shifter block at the other end is angularly disposed at about 45° and is in alignment with the opening in the bar adjacent that end of the valve member. This is pictured in FIG. 8 where the block 87 at the left end or rearward end of the valve member 12 is vertical while the block 88 in the foreground is angularly offset at about 45° and in register with the oversize rectangular hole 96 in the foremost power bar. As shown in FIG. 8, the rectangular openings 95, 96 aligned with the opposite ends of an individual valve member 12 are angularly displaced at about 90° so that the rectangular opening in one bar is in register with the rectangular shifter block at the same end of the valve member, while the rectangular opening in the bar at the opposite end of the valve member is out of register with the block carried by the valve member adjacent the opening. In this position of the shifter block assembly, when the shifter block assembly is positioned by the adjacent solenoid as shown in FIG. 8 and the power bars 69, 70 are operated to move from the spaced position shown mutually toward each other, the rearward bar, as pictured in this figure, engages the shifter block 87 on the far end of the valve member 12 to shift the valve member forwardly whereupon the shifter block 88 in the foreground enters the registering opening 96 in the foremost power bar 70 as the latter moves in the opposite direction. In this manner the valve member 12 may be shifted from the closed position in FIG. 5 to the open position of FIGURE 1, or if in that position (FIG. 8) remains there. By rotating the shifter blocks 45° counterclockwise as viewed in FIG. 8, the shifter block 87 at the far end of the valve member will be positioned in register with the rectangular opening 95 in the rearward power bar 69 while the shifter block 88 in the foreground of FIG. 8 will be positioned out of register with the adjacent power bar opening 96. When the power pistons 18, 19 are operated with the shifter blocks in this position, the valve member 12 will be moved at the closed position from the position of FIG. 8, or if in that position as shown in FIG. 5 remains there.

In the present case the axial extension 91 by means of which the shifter block assembly is turned is a flat bar relatively small in cross section so as to fit through the rectangular opening 96 in the adjacent right power bar 70. This axial extension 91 is slidably received in a rectangular slot in one end of a coupling link 98 supported on the frame 40 by a shaft 99 which is mounted in axial alignment with the piston valve member 12. Such coupling link 98 transmits rotary motion of the shaft 99, produced by the connected solenoid 24 while allowing the valve member 12 to shift axially without restriction during the valve shifting operation. A shifter arm 100 is fixed in a slot at the free end of the shaft 99 so that it extends laterally for connection to the actuating solenoid 24. In the present mechanism the end of the shifter arm 100 spaced from the shaft 99 is fastened to a tension spring 102 which tends to pull the arm down to rotate the shifter block assembly. The solenoid 24 is connected to the shifter arm 100 by a roller 103 suspended from the solenoid armature by a U-shaped connecting link 104. When the solenoid is energized from the control panel 35, the armature is drawn up so that the roller engages and lifts the shifter arm connected to the shifter block assembly, which is arranged as a lever of the third class, to rotate the shifter block assembly against the force of the spring.

Figure 3:
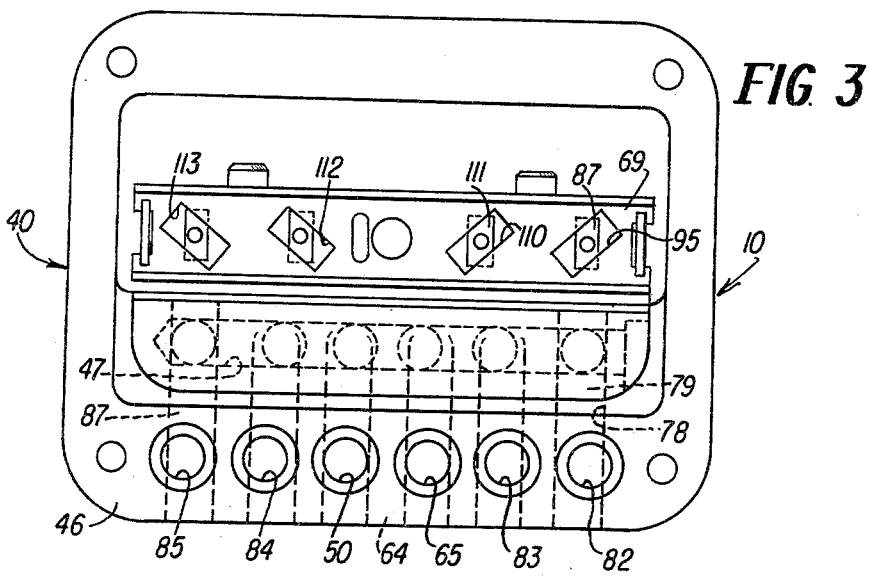
FIG. 3 is a vertical elevational view looking at the right end of the multiple valve illustrated in FIGURE 1.
Figure 4:
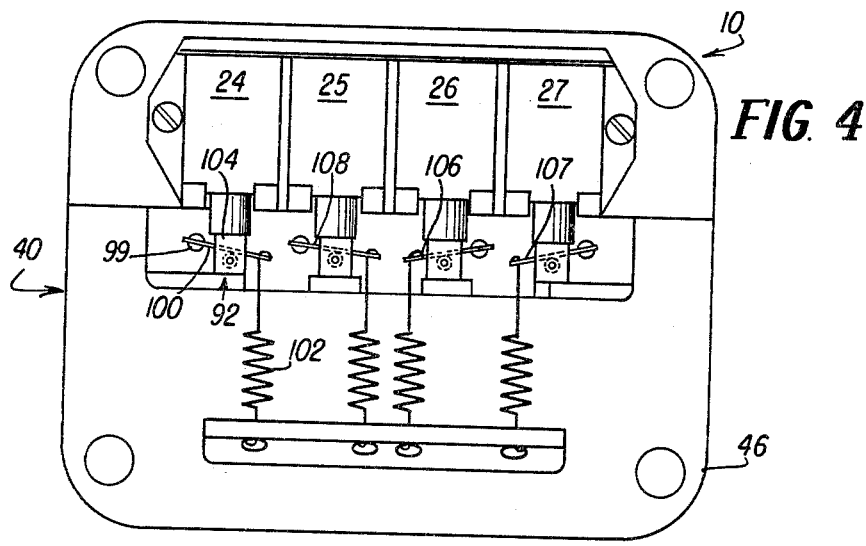
FIG. 4 is a vertical elevational view looking at the opposite end of the multiple valve.

In the interest of providing a compact and easily serviced arrangement, the shifter arms are differently arranged for different ones of the shifter block assemblies. As viewed in FIGS. 1 and 4, the pair of shifter arms 106, 107 on the right side of the multiple valve 10 extend in the opposite direction to the pair of shifter arms 100, 108 on the left side. When the solenoids 26, 27 on the right are energized to draw up the respective armatures, the shifter block assemblies associated therewith are rotated clockwise (viewed from the solenoid end) while with the pair of solenoids 24, 25 on the left, upon energization the associated shifter block assemblies are rotated counterclockwise. Because of this difference in direction of rotation of the shifter block assemblies, the rectangular openings in the power bars are arranged oppositely. Referring to FIG. 3, the openings 95, 110 in the power bar 69 for the pair of shifter blocks 87, 111 on the right as viewed in this figure are inclined upwardly and to the right while the power bar openings 112, 113 on the left are inclined to the left so as to register with the adjacent shifter blocks upon energization of the associated solenoids. Similarly, the rectangular openings in the opposite power bar 70 are displaced 90° from the rectangular openings visible in FIG. 3, and thus the openings for one pair of valves are angularly offset opposite to the openings for the other pair of valves.

To operate the solenoids 24–27 of the multiple valve 10 for selector purposes, the solenoids may be electrically operated by a suitable control device, herein shown in FIG. 2 as a control panel 35. Preferably the panel 35 also includes a device for actuating the three way valve 68 in the power cylinder return line to connect the power cylinder return port 62 to drain and thereby start the operation of the power pistons 18, 19 once the solenoids 24–27 have been energized to set up the selector elements. Because the individual valves 12–15 are balanced, the valves may be shifted without first disconnecting the multiple valve 10 from the pressure fluid supply and, therefore, it is possible to use the system of FIG. 2 where a single valve 68 in the line leading to the return port 62 of the power cylinder 17 is effective to control the operation of the power cylinder to shift the valves of the multiple valve 10. It will be understood, however, that any desired control arrangement may be employed.

I claim as my invention:

1. In combination, a multiple valve having a set of similar shiftable valve members, a power member, means mounting said valve members and power member for relative movement, means between each valve member and said power member for concurrently shifting selected valve members including a movable element carried by one of (a) each valve member or (b) said power member; said movable element having a position for engagement by the other member (a) or (b) upon such relative movement whereby to shift the respective valve member, and means for selectively moving each said element into said position.

2. In combination, a multiple valve having a row of similar shiftable valve members arranged side by side, a power member positioned transversely to said valve members and in alignment therewith at one end of said row, means mounting said valve members and said power member for relative axial movement, means between each valve member and said power member for concurrently shifting selected valve members including a movable element carried by one of (a) each valve member or (b) said power member; said movable element having a position for engagement by the other member (a) or (b) upon such relative axial movement whereby to shift the respective member, and means for selectively moving each said element into said position.

3. In combination, a multiple valve having a row of similar parallel shiftable valve members, a power member positioned transversely to said valve members and in alignment therewith at one end of said row, means mounting said valve members and said power member for relative axial movement, means between each valve member and said power member for selectively shifting each valve member upon such relative axial movement including a movable element carried by each valve member facing said power member, said power member having an opening registering with said element in one position of the latter, said element having another position out of registration with said opening to engage said power member upon said relative axial movement whereby to shift the respective valve member, and means for selectively moving each said element between said positions.

4. In combination, a multiple valve having a row of shiftable valve members, a power member mounted for movement relative to said valve member, means between each valve member and said power member for concurrently shifting selected valve members upon movement of said power member including a movable element carried by each valve member, and means for selectively moving each said element into position for engagement by said power member upon movement of the latter whereby to shift selected valve members.

5. In combination, a multiple valve having a row of similar shiftable valve members arranged in parallel and in substantially the same plane, a power member positioned transversely to said valve members and in alignment therewith at one end of said row, means mounting said valve members and said power member for relative axial movement, means between each said valve member and said power member for selectively shifting each valve member upon such relative axial movement including a movable element carried by each valve member facing said power member, said power member having an opening registering with said element in one position of the latter, said element having another position out of registration with said opening to engage said power member upon movement of the latter whereby to shift the respective valve member, and means for selectively moving each said element between said positions.

6. In combination, a multiple valve having a row of similar shiftable valve members arranged side by side, a pair of power members positioned transversely to said valve members and in alignment therewith one each at opposite sides of said row, means mounting said power members for movement in mutually opposed directions axially of said valve members, means between each valve member and said power members for concurrently shifting selected valve members including a movable element carried by one of (a) each valve member or (b) said power members; said element having a position for engagement by the other members (a) or (b) upon such movement, and electrical means for selectively moving each said element into said position.

7. In combination, a multiple valve having a row of parallel similar shiftable valve members, a pair of power members positioned transversely to said valve members and in alignment therewith one each at opposite ends of said row, hydraulic power means connected between said power members for moving the latter in mutually opposed directions axially of said valve members, and means between each valve member and both said power members for concurrently shifting selected valve members in one direction or the opposite direction upon such movement of said power members.

8. In combination, a multiple valve having a row of similar parallel shiftable valve members, a pair of power members positioned transversely to said valve members and in alignment therewith at opposite ends of said row, a power cylinder arranged parallel to said valve members and between two of the latter, said power cylinder having a pair of opposed pistons connected to said power members respectively, means for supplying pressure fluid to opposite sides of said power pistons to move said power members in mutually opposed directions axially of said valve members, and means between each valve member and both of said power members for selectively shifting each valve member in one direction or the opposite direction upon such movement of said power members including a pair of movable elements carried by each valve member associated with said power members respectively, each of said pair of movable elements having a position for engagement by one of said power members upon movement of the latter whereby to shift the respective valve member, said elements having complementary positions so that one of said elements engages the associated power member to shift said one valve member in one direction while the other element of the pair is free from engagement with the power member associated therewith, and electrical means for selectively moving said elements between said complementary positions.

9. In combination, a multiple valve having a row of similar shiftable valve members arranged side by side, a pair of power members positioned transversely to said valve members and in alignment therewith one each at opposite ends of said row, means mounting said power members for movement in mutually opposed directions axially of said valve members, and means between each valve member and both of said power members for selectively shifting each valve member in one direction or the opposite direction upon such movement of said power members including a pair of movable elements carried by each valve member associated with said power members respectively, each of said pair of movable elements having a position for engagement by one of said power members upon movement of the latter, said elements having complementary positions so that one of said elements engages the associated power member while the other element of the pair is free from engagement with the power member associated therewith, and electrical means for selectively moving said elements between said complementary positions.

10. In combination, a multiple valve having a row of shiftable valve members, a power member, and means between each valve member and said power member for concurrently shifting selected valve members upon operation of said power member including a movable element carried by one of (a) each valve member or (b) said power member; said element having a shift position for engagement by the other member (a) or (b) whereby to shift the respective valve member, means for selectively moving each said element into said position including a solenoid having an armature, and coupling means connected to said armature for moving said element.

11. In combination, a multiple valve having a row of longitudinally shiftable valve members, a power member, and means between each valve member and said power member for selectively shifting each valve member upon operation of said power member including a rotatable element carried by each said valve member having a shift position for engagement by said power member whereby to shift the respective valve member and a second position free from such engagement, means for selectively moving each said element between said positions including a solenoid having an armature, and means coupled to said armature and rotatable element for translating armature movement to rotary movement whereby to rotate said element.

12. In combination, a multiple valve having a row of similar shiftable valve members, a power member, means mounting said valve member and said power member for relative axial movement, means between each valve member and said power member for selectively shifting each valve member upon such relative axial movement including a rotatable element carried by one of (a) each valve member or (b) said power member; said element having a shift position for engagement by the other member (a) or (b) whereby to shift the respective valve member and a second position free from such engagement, and means for selectively moving each said element between said positions including a solenoid having an armature, resilient means opposing operation of said armature, a shifter shaft rotatably coupled to said rotatable element, and a shifter arm carried by said shifter shaft and operable by said armature upon energization of said solenoid to rotate said shifter shaft whereby to rotate said element.

13. A multiple valve comprising, in combination, a valve housing having a row of parallel bores, similar shiftable valve members arranged side by side in said bores, each having an extension at the same end, means carried by one end of said valve housing for mounting the latter, said extensions projecting through said mounting means to the face thereof, a power member positioned between said housing and said mounting means and coacting with said valve member extensions, a movable element carried by each extension and having a position for engagement by said power member upon movement of the latter whereby to shift the respective valve member, and actuating means carried on said face of said mounting means and connected to said extensions respectively whereby to move each element to said position.

14. A multiple valve comprising, in combination, a flat block having a row of parallel bores, similar shiftable valve members arranged side by side in said bores, each having an extension at the same end projecting from one end of said block, a rigid member carried by said one end of said block and adapted for mounting the latter, said extensions projecting through said member to the face thereof, a power member positioned between said block and said mounting member and coacting with said valve member extensions, a movable element carried by each extension and having a position for engagement by said power member upon movement of the latter whereby to shift the respective valve member, a plurality of actuating means carried on said face of said mounting member, and means connecting said actuating means to said extensions respectively whereby to selectively move each element to said position.

15. A multiple valve comprising, in combination, a valve housing having a plurality of bores, a plurality of shiftable valve members arranged in said bores respectively, each having an extension, means carried by one end of said valve housing for mounting the latter, said extensions projecting to the face of said mounting means, a power member positioned between said housing and said mounting means and coacting with said valve member extensions, a movable element carried by each extension and having a position for engagement by said power member upon movement of the latter whereby to shift the respective valve member, and actuating means carried on said face of said mounting means and connected to each of said extensions for selectively moving each said element to said position.

References Cited in the file of this patent

UNITED STATES PATENTS

| | | |
|---|---|---|
| 1,884,060 | MacMillin | Oct. 25, 1932 |
| 1,967,851 | Wilson | July 24, 1934 |